:::: 
United States Patent [19]
Kaneko et al.

[11] 3,793,950
[45] Feb. 26, 1974

[54] COMBINATION NEW MASTER SUPPLY AND USED MASTER RECEIVING ASSEMBLY

[75] Inventors: Tamaki Kaneko; Katsumi Mizuno, both of Tokyo, Japan

[73] Assignee: Ricoh Co., Ltd., Tokyo, Japan

[22] Filed: Oct. 19, 1972

[21] Appl. No.: 299,090

Related U.S. Application Data

[63] Continuation of Ser. No. 67,045, Aug. 26, 1970, abandoned.

[30] Foreign Application Priority Data
Sept. 4, 1969   Japan.............................. 44-70167

[52] U.S. Cl................. 101/142, 101/130, 101/132, 101/141
[51] Int. Cl. ........................... B41f 7/00, B41f 7/02
[58] Field of Search..... 271/68, 71; 101/132, 132.5, 101/141, 142, 232

[56] References Cited
UNITED STATES PATENTS 3,451,336   6/1969   Mignone......................... 101/132.5
3,234,832   2/1966   Niesen et al......................... 101/232
3,632,107   1/1972   Rehm et al. ........................... 271/71
3,160,413   12/1964  Faeber.............................. 271/68 X
2,588,470   3/1952   Bassist ............................ 101/352 X
3,507,492   4/1970   Spencer................................ 271/68

FOREIGN PATENTS OR APPLICATIONS
852,576    10/1960   England.............................. 101/232

*Primary Examiner*—Ernest T. Wright, Jr.
*Assistant Examiner*—R. E. Suter
*Attorney, Agent, or Firm*—Cooper, Dunham, Clark, Griffin & Moran

[57] ABSTRACT

A used master plate receiving tray device for rotary offset printing machines comprising a receiving tray which is disposed below and formed integrally with a master plate supply tray on which a plurality of master plates to be automatically supplied to the master cylinder of the machine are piled in a stack. A used master plate is automatically removed from the master cylinder and slipped into the receiving tray.

2 Claims, 3 Drawing Figures

PATENTED FEB 26 1974    3,793,950

INVENTORS
KATSUMI MIZUNO
TAMAKI KANEKO

BY  Henry T. Burke
      ATTORNEY

COMBINATION NEW MASTER SUPPLY AND USED MASTER RECEIVING ASSEMBLY

This is a continuation, of application Ser. No. 67,045 filed Aug. 26, 1970 now abandoned.

BACKGROUND OF THE INVENTION

Generally, in a rotary offset printing machine, a master plate is mounted on the master cylinder of the machine and is inked, after being etched, for performing a printing operation. When a predetermined number of copy sheets have been duplicated for each master plate, the used master plate is removed from the master cylinder and another master plate is mounted on the vacated master cylinder, so that the aforementioned process may be repeated.

In one type of offset printing machine, a master plate is manually mounted on the master cylinder and removed therefrom. Another type of rotary offset printing machine is provided with an automatic master plate supply device which operates such that one master plate after another is automatically supplied to the master cylinder. In such machine, a predetermined number of master plates are piled in a stack on the master plate supply tray beforehand and each of the master plates is automatically supplied to the master cylinder. After a predetermined number of copy sheets are duplicated for each master plate, the used master plate is automatically expelled from the master cylinder so that the used master plates are piled on the used master plate receiving tray. In conventional automatic rotary offset printing machine, the master plate supply tray is positioned posterior to the master cylinder and the used master plate receiving tray is disposed anterior to the master cylinder. In other words, the master plate supply tray and receiving tray are oppositely located with respect to the master cylinder. This arrangement has a disadvantage in that the machine as a whole has an increased overall size because the master plate supply tray and the used master plate receiving tray stick out from the machine on the front and rear sides thereof. Another disadvantage lies in the fact that since the used master plate receiving tray is not disposed posterior to the master plate, or on the side of the machine near to the operator, the operator is faced with difficulties in immediately checking on whether the used master plate expelling action has been performed satisfactorily.

SUMMARY OF THE INVENTION

This invention relates to used master plate receiving tray devices for rotary offset printing machines. More particularly, the invention is concerned with a tray device for receiving used master plates adapted for use with rotary offset printing machines of the type which are provided with an automatic master plate supply device capable of automatically supplying one master plate after another to the master cylinder of the machine and a master plate discharging device capable of automatically removing each used master plate from the master cylinder.

An object of the invention is to provide a used master plate receiving tray device for rotary offset printing machines which is easy to handle and which enables obtaining a compact overall size in a rotary offset printing machine; moreover, the unique tray device facilitates ready checking as to whether or not the used plate releasing operation has been performed satisfactorily.

Another object of the invention is to provide a used master plate receiving tray device for rotary offset printing machines which permits a used master plate to readily and smoothly slip into the tray after being automatically removed from the master cylinder.

DESCRIPTION OF THE PREFERRED EMBODIMENTS

Figure 1:
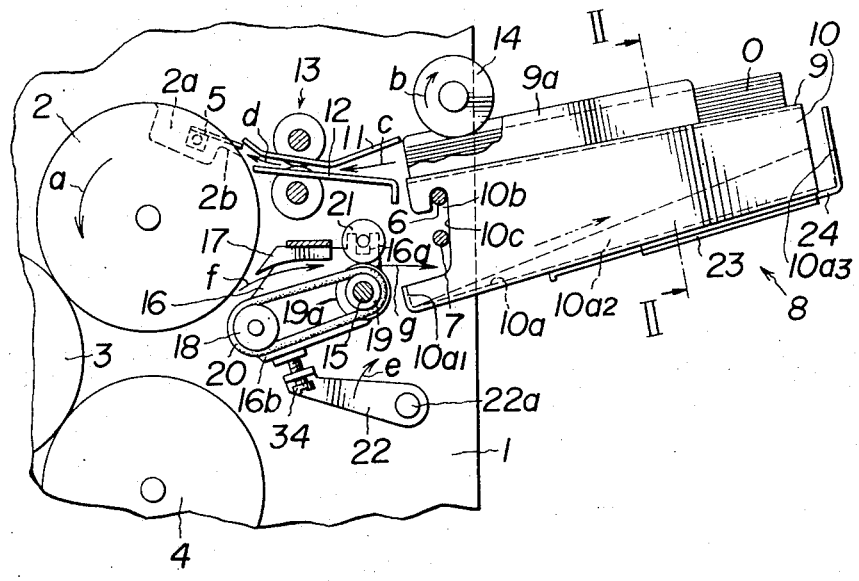
FIG. 1 is a fragmentary side view of a rotary offset printing machine provided with the used master plate receiving tray device according to this invention showing the master plate supply device and the used master plate discharging device.

A rotary offset printing machine is known which comprises a master cylinder 2, a blanket cylinder 3 and an impression cylinder 4, rotatably mounted on side plates 1 of the machine frame and operatively connected with one another for rotation in a predetermined direction, as well as an automatic master plate supply device having clamp means 5 cooperating with a flat edge of a recess 2a in the master cylinder 2 for gripping the leading edge of a master plate.

Two solid rods 6 and 7 spaced apart vertically and disposed parallel to each other are firmly connected to the side plates 1 in positions posterior to the master cylinder 2 (or on the right side thereof in FIG. 1).

A used master plate receiving tray device 8 according to this invention comprises as its principal components a master plate supply tray 9 for receiving thereon a plurality of master plates 0, and a casing 10 formed below the master plate supply tray 9, such casing 10 including a bottom plate which serves as a tray 10a for receiving thereon used master plates removed from the master cylinder.

The master plate supply tray 9 includes side plates 9a and 9b which are conveniently mounted on the supply tray 9 and capable of movement across the width of the tray for contacting the master plates 0 on opposite side edges and holding them therebetween. This arrangement aids in aligning the master plates 0 and holding them in place on the tray.

The casing 10 includes two side plates which are formed on the front end edges thereof with cutouts having engaging portions 10b, 10b which are adapted to engage the rod 6. The cutouts also have edges 10c, 10c which abut against the rod 7 when the used master plate receiving tray device 8 is mounted on the side plates 1 of the machine frame in such a manner that the device is tilted with its forward end being disposed slightly below its rear end. Alternatively, the used master plate receiving tray device 8 may be disposed such that the master plate supply tray 9 is disposed in a horizontal plane.

Mounted anterior to the master plate supply tray 9 are upper and lower guide plates 11 and 12 which define a supply path. A pair of master plate delivery rollers 13, 13 are mounted in one portion of the supply path for rotation while pressing against each other.

When the used master plate receiving tray device 8 is mounted on the side plates 1 by engaging the rods 6 and 7 as aforementioned, a master plate supply roller 14 is brought into contact with the forward end portion of the master plates 0 disposed on the master plate supply tray 9 for pressing against the same with a suitable force. The master plate supply roller 14 is adapted to rotate in the direction of the arrow b when the master plate is to be fed for delivering the uppermost master plate of the stack of master plates 0 to the master cylinder 2. A given master plate moves between the guide plates 11 and 12 in the direction of the arrow c to be gripped by the pair of delivery rollers 13 and moved in the direction of the arrow d. The clamp means 5 provided in the master cylinder 1 is adapted to be disposed in the position shown in FIG. 1 where it opens toward the end of the supply path as the master cylinder 2 rotates in the direction of the arrow a, so that the leading end of the master plate being delivered enters the space between the clamp means 5 and an edge 2b of the cutout formed in the master cylinder 2. Slight rotation of the master cylinder 2 brings the clamp means 5 into pressing contact with the edge 2b so as to hold the leading end of the master plate firmly in place on the master cylinder 2. Further rotation of the master cylinder 2 results in the master plate being mounted on the master cylinder by being wound in its entirety on the master cylinder. A predetermined number of copy sheets are reproduced by the master plate mounted on the master cylinder in this way.

Support means 16 pivotally supported by a shaft 15 connected to the side plates 1 of the machine frame is disposed below the supply path. The support means 16 includes a number of peeling pawls (only one is visible) 17 disposed in side by side relation on the upper side of the support means and facing the peripheral surface of the master cylinder 2. The support means 16 also includes a roller 18 disposed below the peeling pawls 17, a roller 19 mounted on the shaft 15, and an endless belt 20 mounted on the two rollers 18 and 19. The support means 16 is formed, in the upper portions of the opposite ends of the roller 19, with cutouts (only one is visible) 16a which receive therein opposite ends of a roller 21 which bears against an elevated portion 19a of the roller 19 by its own weight. The support means 16 is formed at its lower edge with a bent portion 16b which is disposed against the upper end of a headed screw 34 mounted on the forward bent portion of a lever 22. The lever 22 is adapted to move in pivotal motion in the direction of the arrow e about a shaft 22a to move the support means 16 toward the master cylinder 2 when the master plate mounted on the master cylinder is removed and expelled therefrom.

The support means 16 moves in pivotal motion about the shaft 15 in a clockwise direction in FIG. 1, so that the leading edges of the peeling pawls 17 and the belt 20 are brought into pressing engagement with the peripheral surface of the master cylinder 2. At this time, the master cylinder 2 is disposed such that the clamp means 5 opens in the position of the peeling pawls 17. Thus, the master plate mounted on the master cylinder 2 is removed therefrom by the peeling pawls 17, 17 and moved in the direction of the arrow f by the belt 20 to be gripped between the elevated portion 19a of the roller 19 and the roller 21.

The used master plate gripped between the rollers 19 and 21 and expelled in the direction of the arrow g is introduced into the casing 10. The casing 10 defines therein a receiving tray 10a which includes a relatively low wall 10a1 formed in the lower edge of a front opening of the casing 10 by upwardly bending the lower edge for preventing the used master plate disposed on the receiving tray 10a from slipping off the tray. The height of the wall 10a1 is selected such that the wall 10a1 does not interfere with the movement of the used master plate introduced into the receiving tray through the front opening of the casing.

Figure 2:
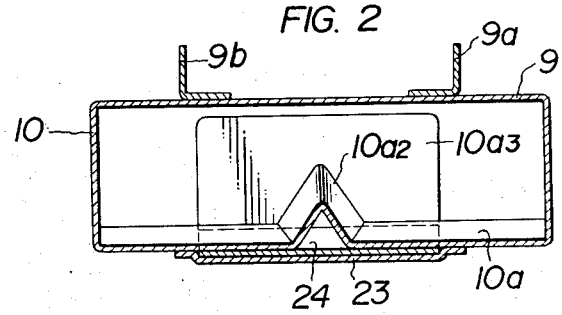
FIG. 2 is a sectional view taken along the line II—II of FIG. 1.

The receiving tray 10a is formed, in the central portion of the tray as seen in FIG. 2, with a guide protuberance 10a2 which extends longitudinally of the tray and has a ridge which becomes increasingly higher in going from the entrance or opening of the casing 10 (on the left as seen in FIG. 1) toward the rear end of the casing. The provision of the guide protuberance shaped as aforementioned facilitates the receiving of the master plate which is relatively firm. A backing plate 23 is provided on the underside of the casing 10 so that the plate 23 and the bottom plate of the casing define therebetween a space in which a sliding plate 24 is received for sliding motion back and forth. The sliding plate 24 includes a rear end which is bent upwardly to form a stopper 10a3 serving as the rear wall of the casing 10. By moving the sliding plate 24 back and forth, the stopper 10a3 can be disposed in an optimum position for the particular master plates being received in the used master plate receiving tray 10a.

Figure 3:
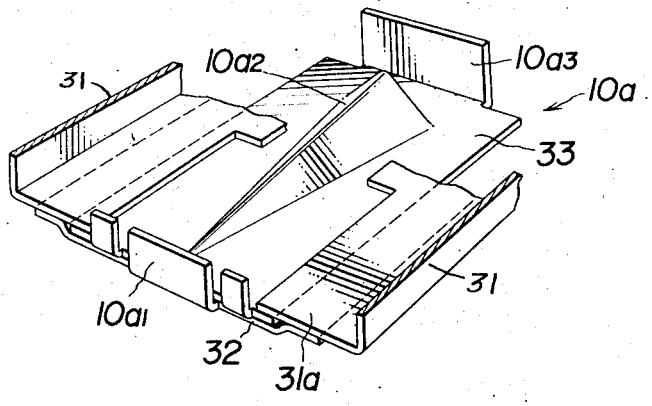
FIG. 3 is a perspective view of the used master plate receiving tray device comprising another embodiment of the invention.

FIG. 3 shows another embodiment of the used master plate receiving tray device according to this invention. As shown, a receiving tray 10a comprises side walls 31, and a bottom plate 31a which is cutout in the center. The tray 10 also comprises a backing plate 32 which is provided on the underside of the bottom plate 31a to define therebetween a space in which a sliding plate 33 is slidably fitted. The sliding plate 33 is formed in the central portion of its surface with a guide protuberance 10a2 of the same configuration as the guide protuberance described with reference to FIG. 2. The sliding plate 33 is also formed with a stopper 10a3 at its rear end. The wall 10a1 for preventing the master plate from slipping off the tray is provided by bending upwardly, a forward end portion of the backing plate 32.

What we claim is:

1. A rotary offset printing machine comprising: a rotary master cylinder having means for releasably holding master plates mounted thereon, means for storing a stack of new master plates to be mounted on the master cylinder for printing therewith and a stack of used master plates removed from the master cylinder after printing therewith, and means for selectively and successively taking master plates from the stack of new master plates, moving said master plates toward the master cylinder and mounting said plates thereon, removing the mounted master plates from the master cylinder and moving the removed master plates toward and storing them with the stack of used master plates, wherein the machine includes a wall at a fixed position with respect to the master cylinder and includes means for removably securing the storing means to said wall, said storing means comprising:

a new master plate tray for storing a stack of new master plates thereon, said new master plate tray having an opening facing said wall and forming a passageway for new master plates taken from the stack of new master plates by the means for mounting master plates on the master cylinder and moved toward the master cylinder thereby;

a used master plate tray for storing a stack of used master plates, said used master plate tray having an opening facing the same wall of the machine as the tray for storing new master plates to form a passageway for master plates removed from the master cylinder and moved toward the stack of used master plates on the used master plate tray by the means for removing master plates from the master cylinder, said used master plate tray including a bottom and a sliding plate thereon provided with a stopper for limiting the distance between said wall of the machine and the end of the used master plate tray which is opposite therefrom and means for adjusting the distance of the stopper from said opening of the used master plate tray, said sliding plate being provided with a guide protuberance having a ridge whose height from the bottom of the used master plate tray increases in the direction toward said stopper; and means for fixedly securing together the new master plate tray and the used master plate tray to form a single integral unit, whereby new master plates enter the machine from the same side through which used master plates are ejected from the machine, thereby allowing an operator of the machine to observe the supply of both new and used master plates from the same side of the machine, and whereby the new and used master plate trays and the stacks of master plates thereon can be removed from the machine as a single integral unit and replaced on the machine as a single integral unit.

2. A printing machine as in claim 1 wherein said used master plate tray is disposed directly below the new master plate tray.

* * * * *